United States Patent
Babbar et al.

(10) Patent No.: US 11,876,643 B2
(45) Date of Patent: Jan. 16, 2024

(54) ALLOCATION AND MANAGEMENT OF TUNNEL ENDPOINTS IN SOFTWARE DEFINED NETWORKS

(71) Applicant: VMware LLC, Palo Alto, CA (US)

(72) Inventors: Mansi Babbar, Fremont, CA (US); Subin Cyriac Mathew, San Jose, CA (US); Chidambareswaran Raman, Sunnyvale, CA (US); Ankit Parmar, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 460 days.

(21) Appl. No.: 16/519,931

(22) Filed: Jul. 23, 2019

(65) Prior Publication Data

US 2021/0028957 A1    Jan. 28, 2021

(51) Int. Cl.
*H04L 12/46*   (2006.01)
*H04L 12/927*  (2013.01)
*G06F 9/455*   (2018.01)
*H04L 47/80*   (2022.01)

(52) U.S. Cl.
CPC ...... *H04L 12/4633* (2013.01); *G06F 9/45558* (2013.01); *H04L 12/4641* (2013.01); *H04L 47/805* (2013.01); *H04L 47/808* (2013.01); *G06F 2009/45587* (2013.01); *G06F 2009/45595* (2013.01)

(58) Field of Classification Search
CPC ............ H04L 12/4633; H04L 12/4641; H04L 47/805; H04L 47/808; G06F 2009/45587; G06F 2009/45595
See application file for complete search history.

(56) References Cited

U.S. PATENT DOCUMENTS

| | | | |
|---|---|---|---|
| 2013/0125124 A1* | 5/2013 | Kempf | H04L 41/042 718/1 |
| 2014/0208317 A1* | 7/2014 | Nakagawa | G06F 9/45533 718/1 |
| 2016/0299775 A1* | 10/2016 | Madapurath | H04L 12/4633 |
| 2019/0007280 A1* | 1/2019 | Sarangam | H04L 41/5003 |
| 2020/0177654 A1* | 6/2020 | Mittal | H04L 61/6022 |

* cited by examiner

*Primary Examiner* — Derrick V Rose
(74) *Attorney, Agent, or Firm* — Quarles & Brady LLP

(57) ABSTRACT

Described herein are systems and methods for allocating to tunnel endpoints to virtual machines on a host. In one example, a host identifies when a new virtual machine is coupled to a virtual switch and determines a tenant associated with the new virtual machine. The host further determines whether a tunnel endpoint is allocated to the tenant and, when a tunnel endpoint has not been allocated, allocates a new tunnel endpoint to the tenant and maps the new virtual machine to the new tunnel endpoint.

20 Claims, 6 Drawing Sheets

ALLOCATION AND MANAGEMENT OF TUNNEL ENDPOINTS IN SOFTWARE DEFINED NETWORKS

BACKGROUND

Virtual computing environments may employ virtual nodes, such virtual machines and containers, to provide various operations for tenants of the computing environments. To facilitate communications by the virtual nodes, the computing environments may employ software defined networks that can provide switching operations, routing operations, distributed firewall operations, and the like, and may be used to intelligently direct communication on the network by inspecting packets before passing them to other computing nodes (both real and virtual). For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like within the data packet and, when identified, provide a set of actions to be asserted against the data packet. These actions may include modifications to the data packet, and forwarding rules for the data packet, amongst other possible operations.

In some examples, to communicate data packets between virtual nodes on different host computing systems, a virtual computing environment may employ tunnel endpoints, such as such as a Virtual Extensible Local Area Network (VXLAN) tunnel endpoints (VTEPs). These tunnel endpoints are mapped to virtual nodes on a host, such that packets are forwarded from the virtual nodes to the tunnel endpoints. Once received at the tunnel endpoints, the tunnel endpoints may encapsulate the packets into a tunneling format, such as VXLAN or Generic Network Virtualization Encapsulation (GENEVE), and forward the packets over a physical network interface to another physical computing system.

However, while a tunnel endpoint is advantageous in communicating tunneling packets between computing systems, a computing environment with multiple tenants may encounter difficulties in distinguishing between encapsulated packets that correspond to a first tenant. This may limit the computing environments ability to determine network usage by each of the tenants and manage the quality of service provided to each of the tenants.

OVERVIEW

The technology disclosed herein manages the allocation of tunnel endpoints in software defined networks. In one implementation, a management operation identifies a connection of a virtual machine to a port of a virtual switch on a host. The management operation identifies a tenant of a plurality of tenants associated with the virtual machine and determines whether a tunnel endpoint is allocated to the tenant on the host. When a tunnel endpoint is not allocated to the tenant, the operation further allocates a tunnel endpoint on the host to the tenant and maps the virtual machine to the tunnel endpoint.

DETAILED DESCRIPTION

Figure 1:
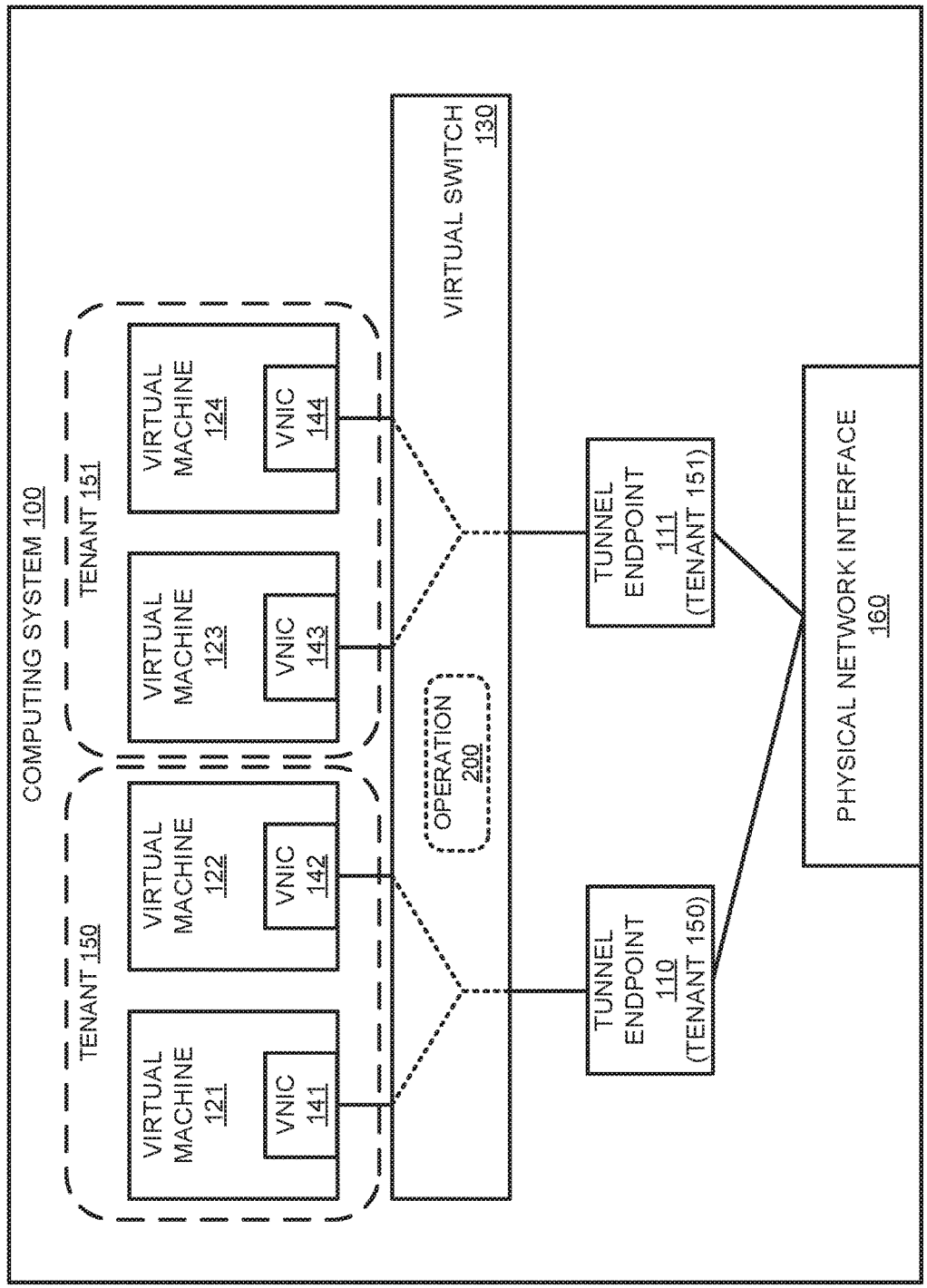
FIG. 1 illustrates a computing system to host virtual machines according to an implementation.

FIG. 1 illustrates a computing system 100 to host virtual machines according to an implementation. Computing system 100 includes virtual machines 121-124, virtual switch 130, tunnel endpoints 110-111, and physical network interface 160. Virtual machines 121-124 further include virtual network interfaces (VNICs) 141-144 that are used to couple the virtual machines to ports on virtual switch 130. Virtual switch 130 provides operation 200 that is further described in FIG. 2.

In operation, virtual machines 121-124 are deployed by tenants 150-151 to provide various operations for the tenants, including front end application operations, database operations, or some other operation. To provide communications for the tenants, each of the tenants are coupled to ports on virtual switch 130 using VNICs 141-144. Virtual switch 130 may be used to intelligently direct ingress and egress packets for virtual machines 121-124 based on various attributes identified in the packets, wherein the attributes may comprise internet protocol (IP) addresses, media access control (MAC) addresses, protocol, or some other attributes identified in the packets. In some implementations, to communicate packets between hosts, a host may employ a tunnel endpoint, such as a Virtual Extensible Local Area Network (VXLAN) tunnel endpoint (VTEP), that can be used to encapsulate the packets from the virtual machines and communicate the encapsulated packets to one or more other computing systems. The encapsulated packets may include additional source and destination IP addresses associated with the tunnel endpoint, may include additional source and destination MAC addresses associated with the tunnel endpoint, or any other attribute to provide addressing between tunnel endpoints across host computing systems. More details of an exemplary implementation of a tunnel endpoints for implementing software defined networks (SDNs) can be found in U.S. Pat. No. 10,230,576, granted Mar. 1, 2019, which is fully incorporated herein by reference.

In the present implementation, virtual switch 130 may associate each tenant on computing system 100 with a unique tunnel endpoint, wherein each tunnel endpoint corresponds to a unique tenant identifier (ID). The tenant ID may include a virtual local area network (VLAN) identifier associated with the tenant, a source IP address for the encapsulated packets, a source MAC address, or some other identifier information for the tenant, including combinations thereof. When a packet is to be communicated by a virtual machine associated with a particular tenant, such as virtual machine 121 associated with tenant 150, the packet from the virtual machine is mapped to tunnel endpoint 110 that is unique to tenant 150. Once obtained at tunnel endpoint 110, tunnel endpoint 110 may encapsulate the packet from the virtual machine using VXLAN, Generic Network Virtualization Encapsulation (GENEVE), or a different tunneling protocol, and communicate the packet to a destination host computing system using physical network interface 160.

In some implementations, when a new tunnel endpoint is added to computing system 100, information about the tunnel endpoint may be provided via a control plane (not shown) to other computing systems in the computing environment, such that the tunnel endpoint may communicate with tunnel endpoints on the other computing systems. In one example, other tunnel endpoints that correspond to the tenant may be provided with VLAN information, source IP address information, or any other similar information such that packets from the new tunnel endpoint may be processed appropriately. Additionally, any switching or routing mechanisms at the encapsulation layer may be provided with addressing and VLAN information associated with the new tunnel endpoint, such that packets associated with the tenant may be provided an associated quality of service.

Figure 2:
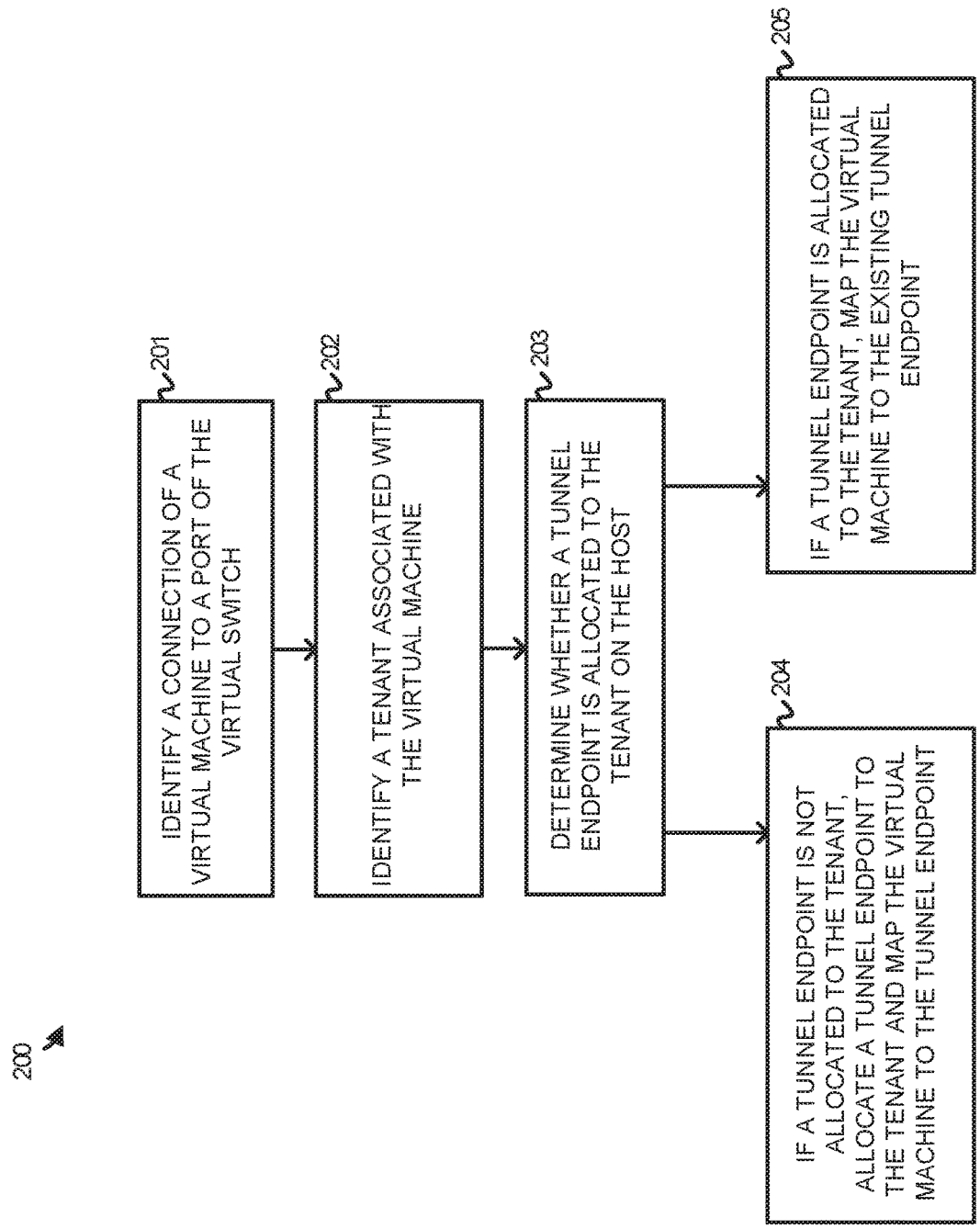
FIG. 2 illustrates an operation of a computing system to manage the allocation of tunnel endpoints according to an implementation.

FIG. 2 illustrates an operation 200 of a computing system to manage the allocation of tunnel endpoints according to an implementation. The processes of operation 200 are referenced parenthetically in the paragraphs that follow with reference to elements and systems from computing system 100 of FIG. 1. Although depicted as operating as part of virtual switch 130, it should be understood that operation 200 may occur as a separate process on computing system 100 or on another computing system in some examples.

As depicted, operation 200 includes identifying (201) a connection of a virtual machine to a port of a virtual switch on the host. In some implementations, an administrator associated with a tenant may request the deployment of one or more virtual machines in a computing environment. Once requested, a host may be identified for each of the one or more virtual machines and the virtual machines may be initiated on the corresponding host or hosts. Additionally, a deployed virtual machine may be connected to a virtual switch executing on the host, where the virtual switch may perform at least the switching, routing, and firewall operations associated with the virtual machine. In particular, the virtual switch may identify addressing and communication attributes in ingress and egress packets for the virtual machine and perform various operations on the packet. These operations may include blocking the packet, forwarding the packet to another virtual machine, providing the packet to a tunnel endpoint, or some other operation.

After a connection is identified for a virtual machine, operation 200 further identifies (202) a tenant associated with the virtual machine. In some implementations, when a virtual machine is deployed in a computing environment, information about the virtual machine is provided by a management service to the virtual switch that is supporting the virtual machine. The information may include the type of application provided by the virtual machine, the tenant associated with the virtual machine, or some other information. Consequently, when the virtual machine connects to the port of the virtual switch, the virtual switch may also receive the identity of the tenant associated with the newly added virtual machine.

Once the tenant is identified, operation 200 determines (203) whether a tunnel endpoint is allocated to the tenant on the host and, when a tunnel endpoint is not allocated to the tenant on the host, allocates (204) a tunnel endpoint to the tenant and maps the virtual machine to the tunnel endpoint. Allocating the tunnel endpoint may require instantiating a new tunnel endpoint for the allocation. Instantiation of the new tunnel endpoint may require initiating a new process for the new tunnel endpoint and assigning (e.g., via a control plane request) a physical IP address (an IP address accessible from the physical network) for the new tunnel endpoint. In contrast, when a tunnel endpoint is allocated to the tenant, maps (205) the virtual machine to the existing tunnel endpoint. As an example, when virtual machine 122 is added to computing system 100 and coupled to a port of virtual switch 130, virtual switch 130 may determine whether a tunnel endpoint has been allocated to tenant 150 associated with virtual machine 122. If virtual machine 121 has already been initiated on computing system 100, the virtual switch 130 may identify that tunnel endpoint 110 has been allocated to tenant 150 and map virtual machine 122 to tunnel endpoint 110. The mapping may permit egress packets from VNIC 142 that are destined for another host computing system to pass to tunnel endpoint 110 for encapsulation.

In other implementations, if virtual machine 121 had not been initiated on computing system 100, virtual switch 130 may allocate a new tunnel endpoint 110 to virtual machine 122 and map virtual machine 122 to tunnel endpoint 110, such that packets destined for another host computing system are routed to tunnel endpoint 110. Once tunnel endpoint 110 is allocated to tenant 150, any additional virtual machines that are added to computing system 100 may be mapped to tunnel end point 110.

In some implementations, each tunnel endpoint of tunnel endpoints 110-111 is allocated a tenant ID, that can be used to identify the tenant associated with the encapsulated packet. The tenant ID may comprise a VLAN associated with the tenant, a source IP address associated with the tunnel endpoint, a MAC address associated with the tunnel endpoint, or some other information, including combinations thereof. As an example, the VLAN and IP address combination for tunnel endpoint 110 may be used as a tenant ID for tenant 150. The tenant ID may be used to provide various operations in association with encapsulated packets from each of the tunnel endpoints of computing system 100. The operations may include monitoring network traffic use by each of the tenants, maintaining quality of service for each of the tenants, or providing some other operation with respect to the tenants.

In at least one implementation, a process operating on computing system 100 may inspect the encapsulation packets by tunnel endpoints 110-111 to identify a tenant ID in the header of the encapsulation packets. Once identified, the process may determine a quality of service associated with the tenant and prioritize the packet for communication via physical network interface based on the quality of service. The quality of service may comprise an amount of bandwidth allocated to the tenant, dedicated packet queues for the tenant, or some other quality of service definition. In some examples, in addition to enforcing a quality of service local to computing system 100, encapsulation information may be provided to other host computing systems and/or networking devices for the encapsulated packets. The encapsulation information may include at least the tenant identifier information for each of the tunnel endpoints, such that the other host computing systems and/or networking devices may identify and process the corresponding packets. This processing may include managing a quality of service for packets for the tenant, monitoring bandwidth usage and networking usage by the tenant, or some other operation.

Figure 3:
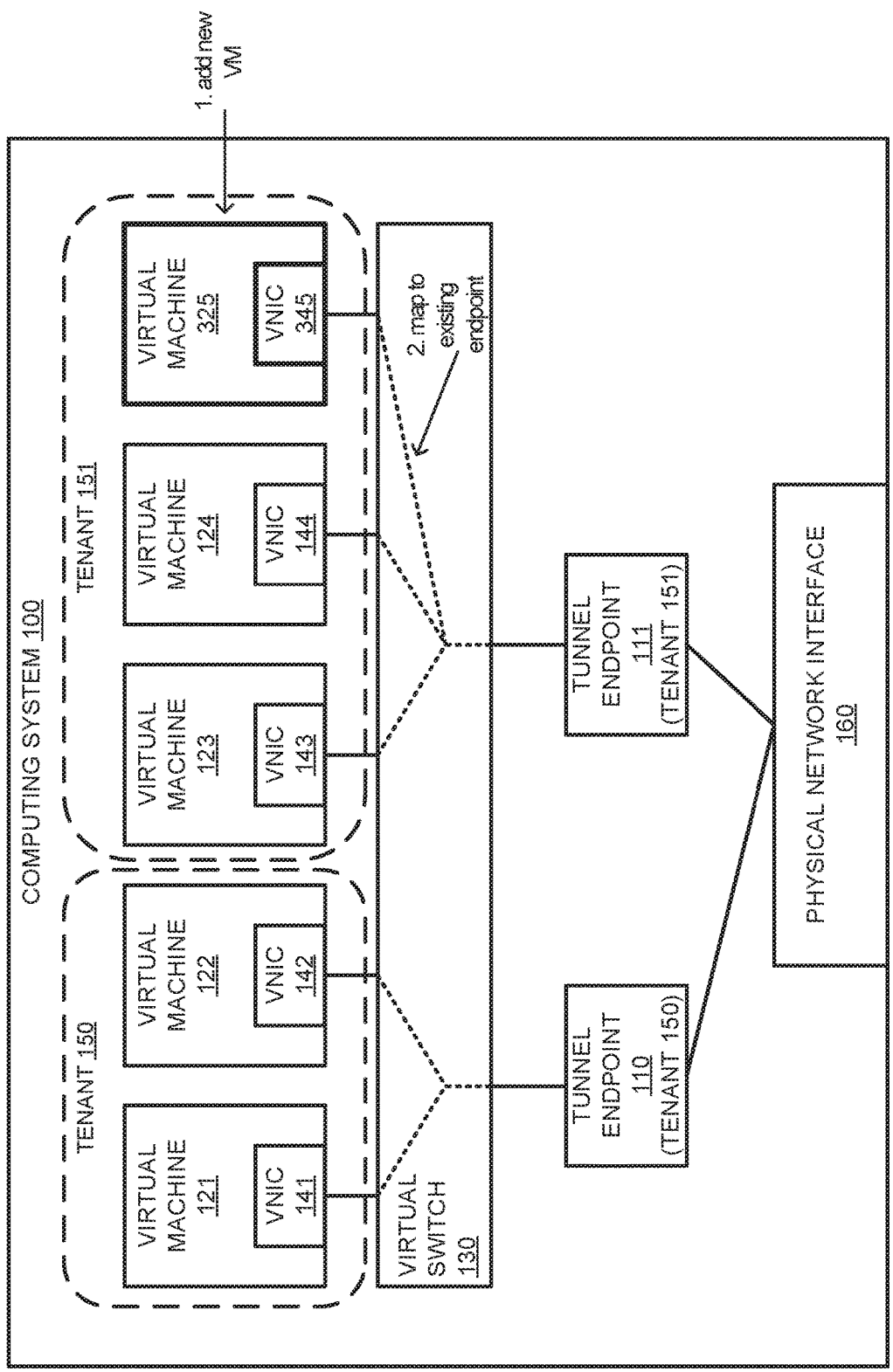
FIG. 3 illustrates an operational scenario of mapping a virtual machine to a tunnel endpoint according to an implementation.

FIG. 3 illustrates an operational scenario of mapping a virtual machine to a tunnel endpoint according to an implementation. The operational scenario includes the elements of computing system 100 of FIG. 1 and further includes virtual machine 325 with VNIC 345.

As described herein, to provide connectivity for virtual machines deployed on computing system 100, virtual switch 130 is included that can provide switching operations, routing operations, distributed firewall operations, and other networking operations. Additionally, computing system 100 includes tunnel endpoints 110-111 that are used to provide encapsulation and tunneling operations to extend virtual networks across multiple host computing systems. Here, each tunnel endpoint of tunnel endpoints 110-111 is allocated to a corresponding tenant of tenants 150-151. In some implementations, tunnel endpoints 110-111 may be allocated to tenants as they are required for the tenants. As an example, when the first virtual machine for tenant 150 is coupled to a port on virtual switch 130, virtual switch 130 may identify an available tunnel endpoint from a pool of available tunnel endpoints and allocate the available tunnel endpoint to the newly connected tenant. This tunnel endpoint may have an allocated source IP address, source MAC address, VLAN tag, or some other configuration attributes. In some implementations, rather than having an available pool of tunnel endpoints, the virtual switch may generate a new tunnel endpoint to the tenant and allocate the required addressing attributes to the endpoint.

In the present implementation, virtual machine 325 is added, at step 1, to computing system 100 and coupled to a port of virtual switch 130 using VNIC 345. In some implementations, when a virtual machine is added to virtual switch 130, virtual switch 130 may obtain information about the virtual machine from a controller service associated with computing system 100. The information may include tenant identifier information for the virtual machine, quality of service requirements for the virtual machine, or any other information associated with the virtual machine. Based on the identified information, virtual switch 130 may determine whether a tunnel endpoint has been allocated to the tenant associated with virtual machine 325. Here, because virtual machine 325 is associated with tenant 151, tunnel endpoint 111 has already been allocated for virtual machines 123-124. As a result, virtual switch 130 may map, at step 2, virtual machine 325 to tunnel endpoint 111. In mapping virtual machine 325 to tunnel endpoint 111, packets may be identified by virtual switch 130 that are required to be communicated to other host computing systems. In particular, while packets from virtual machine 123 to virtual machine 325 may not require encapsulation, packets between virtual machine 325 and a virtual machine on another host computing system for tenant 151 may require encapsulation. Thus, when a packet is identified to be communicated to another host, the packet may be forwarded to tunnel endpoint 111, where tunnel endpoint 111 may perform the required encapsulation prior to communicating the packet via physical network interface 160 to the corresponding destination computing system.

Figure 4:
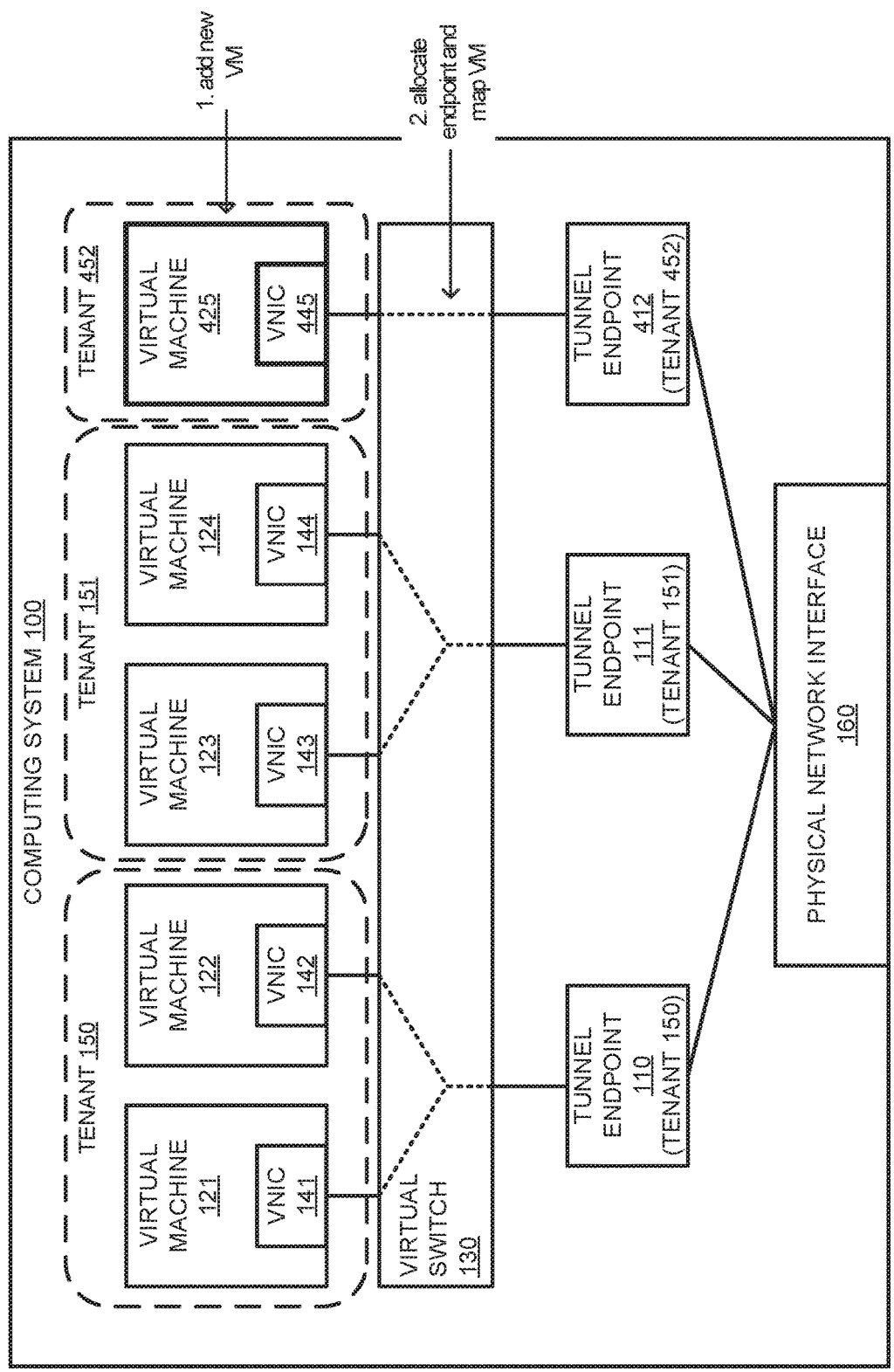
FIG. 4 illustrates an operational scenario of allocating a tunnel endpoint for a virtual machine according to an implementation.

FIG. 4 illustrates an operational scenario of allocating a tunnel endpoint for a virtual machine according to an implementation. The operational scenario includes the elements of computing system 100 of FIG. 1 and further includes virtual machine 425 (corresponding to tenant 452) with VNIC 445 and tunnel endpoint 412.

As described herein, to provide connectivity for virtual machines deployed on computing system 100, virtual switch 130 is included that can provide switching operations, routing operations, distributed firewall operations, and other networking operations. Additionally, computing system 100 includes tunnel endpoints 110-111 that are used to provide encapsulation and tunneling operations to extend virtual networks across multiple host computing systems. Here, each tunnel endpoint of tunnel endpoints 110-111 is allocated to a corresponding tenant of tenants 150-151. In some implementations, tunnel endpoints 110-111 may be allocated to tenants as they are required for the tenants. As an example, when the first virtual machine for tenant 150 is coupled to a port on virtual switch 130, virtual switch 130 may identify an available tunnel endpoint from a pool of available tunnel endpoints and allocate the available tunnel endpoint to the newly connected tenant. This tunnel endpoint may have an allocated source IP address, source MAC address, VLAN tag, or some other configuration attributes. In some implementations, rather than having an available pool of tunnel endpoints, the virtual switch may generate a new tunnel endpoint to the tenant and allocate the required addressing attributes to the endpoint.

In the present implementation, virtual machine 425 is added, at step 1, to computing system 100 and coupled to a port of virtual switch 130 using VNIC 445. When the virtual machine is added to computing system 100, virtual switch 130 may obtain information about the newly added virtual machine from a control service. The information from the control service may identify the tenant associated with the virtual machine, quality of service requirements for the virtual machine, or some other information related to the virtual machine. After the information is obtained, virtual switch 130 may determine whether a tunnel endpoint has been allocated to the tenant.

Here, because virtual machine 425 corresponds to tenant 452, virtual switch 130 determines that a new tunnel endpoint is required for the addition of virtual machine 425. To provide the tunnel endpoint, virtual switch 130 may generate a new tunnel endpoint or allocate, at step 2, tunnel endpoint 412 to tenant 452 and map virtual machine 425 to tunnel endpoint 412. In mapping virtual machine 425 and VNIC 445 to tunnel endpoint 412, virtual switch 130 may perform packet inspection to identify packets to be transferred to other host computing systems in the computing environment from virtual machine 425 and forward the packets to tunnel endpoint 412. Tunnel endpoint 412 may encapsulate the packet and forward the packet to a destination computing system via physical network interface 160. When the packet is encapsulated, tunnel endpoint 412 may include a tenant identifier in the encapsulation header of the packet. The tenant identifier may include a VLAN identifier associated with the tenant, a source IP address associated with tunnel endpoint 412, a source MAC address associated with tunnel endpoint 412, or some other identifiable header information, including combinations thereof.

In some implementations, the tenant identifier information may be provided to other processes and systems (hosts and networking devices) in the computing environment, such that the various operations may be performed in association with the encapsulated packets. These operations may include quality of service enforcement operations, network monitoring operations, network optimization operations, or some other operation. As an example, a quality of service operation on computing system 100 may inspect packets directed toward physical network interface 160 and determine a tenant associated with the packets. Based on the identity of the tenant, the quality of service operation may allocate the packets to transmission queues associated with physical network interface 160, prioritize the packets in a queue for physical network interface 160, or provide some other quality of service operation associated with the packet.

Figure 5:
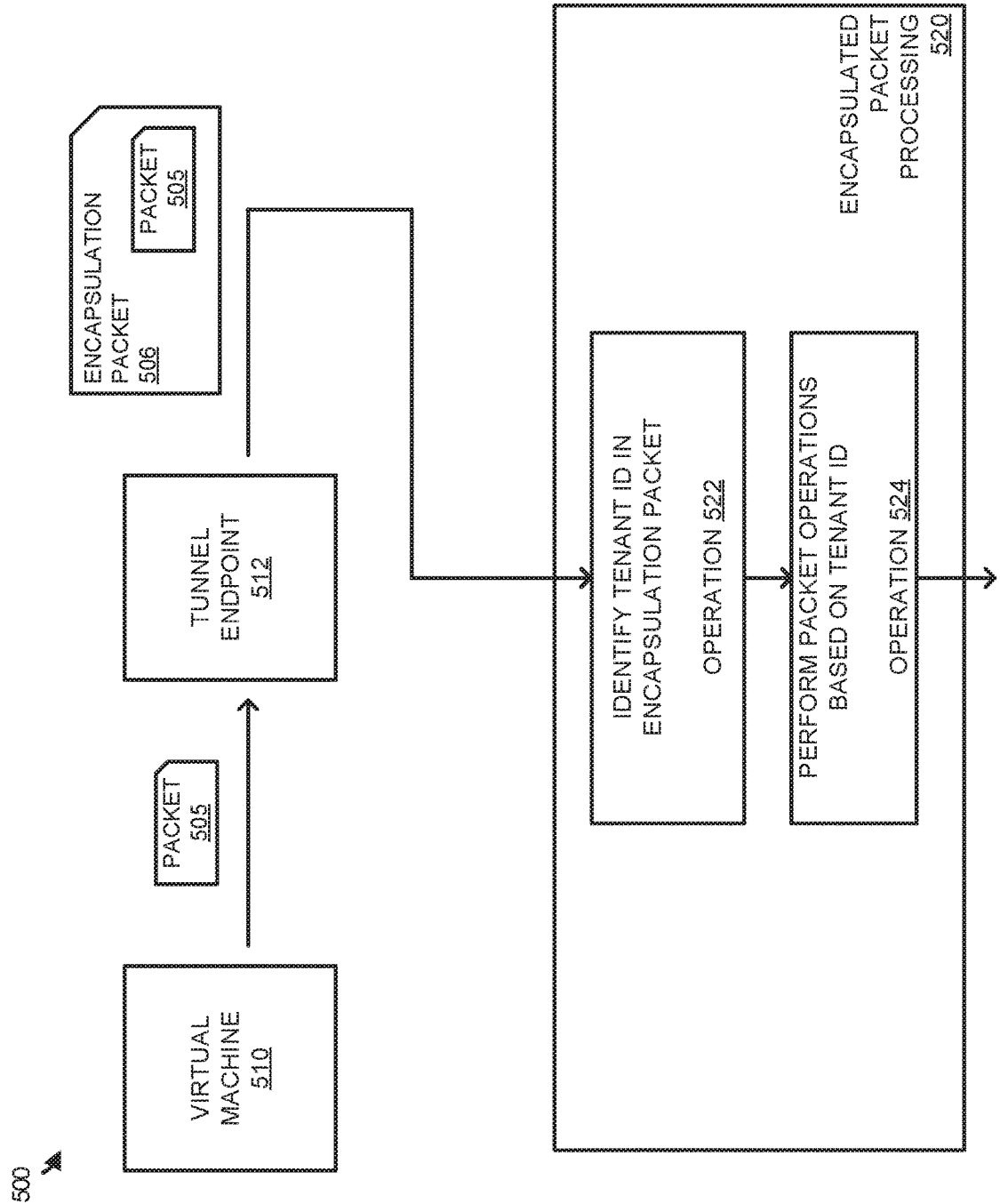
FIG. 5 illustrates a flow diagram of processing encapsulation packets according to an implementation.

FIG. 5 illustrates a flow diagram 500 of processing encapsulation packets according to an implementation. Flow diagram 500 includes packet 505, encapsulation packet 506, virtual machine 510, tunnel endpoint 512, and encapsulated packet processing 520. Encapsulated packet processing 520 includes operations 522 and 524. Virtual machine 510, tunnel endpoint 512, and encapsulated packet processing 520 are representative of operations that can be executed on a single host computing system.

In operation, virtual machine 510 generates packet 505 that is forwarded to tunnel endpoint 512. In some implementations, to provide the connectivity to tunnel endpoint 512, a virtual switch may be used to identify packets from virtual machine 510, determine whether the packets are directed to a computing element on the same logical network as virtual machine 510, determine whether the computing element is located on another host computing system, and forward the packet to tunnel endpoint 512 when the packet corresponds to a computing element on another host. Here, packet 505 is forwarded by the virtual switch to tunnel endpoint 512, where tunnel endpoint 512 generates encapsulation packet 506. Encapsulation packet 506 includes packet 505 and may further include a tenant identifier associated with a tenant for virtual machine 505, where the tenant identifier may include a VLAN identifier for the tenant, a source IP address associated with tunnel endpoint 512, a source MAC address associated with tunnel endpoint 512, or some other tenant identifier information, including combinations thereof. In some implementations, packet 505 may be encrypted as part of the encapsulation process.

Once encapsulation packet 506 is generated, the packet may be provided to encapsulation packet processing 520, wherein encapsulation packet processing 520 first performs operation 522 to identify a tenant identifier in the encapsulation packet. In some implementations, when a tunnel endpoint is added to a host computing system, information about the tunnel endpoint (e.g., a tenant identifier) may be supplied to other processes on the same host computing system or other computing elements in the computing network to provide operations in association with the packet. The operations may include quality of service operations, security operations, network monitoring operations, network optimization operations, or some other operation. Here, once the tenant identifier is extracted from the encapsulated packet, the host performs operation 524 that performs a quality of service operation based on the tenant identifier. In some examples, each of the tenants in the computing environment may be associated with a quality of service that may define how packets are prioritized for communication, what transmission queues are available to each of the tenants, or some other operation. As a result, based on the tenant identifier in the packet, operation 524 may prepare the packet for transmission based on the quality of service associated with the tenant for virtual machine 510.

Although demonstrated as performing an operation locally on the same host as virtual machine 510, it should be understood that operations may be performed by other hosts or networking elements in a computing environment. For example, when a new tunnel endpoint is added to a host, information about the new tunnel endpoint (e.g., a tenant identifier and associated tenant) are provided to other hosts that support the tenant. In this manner, the other hosts of the computing environment may identify packets that correspond to the particular tenant and perform operations related to the tenant.

Figure 6:
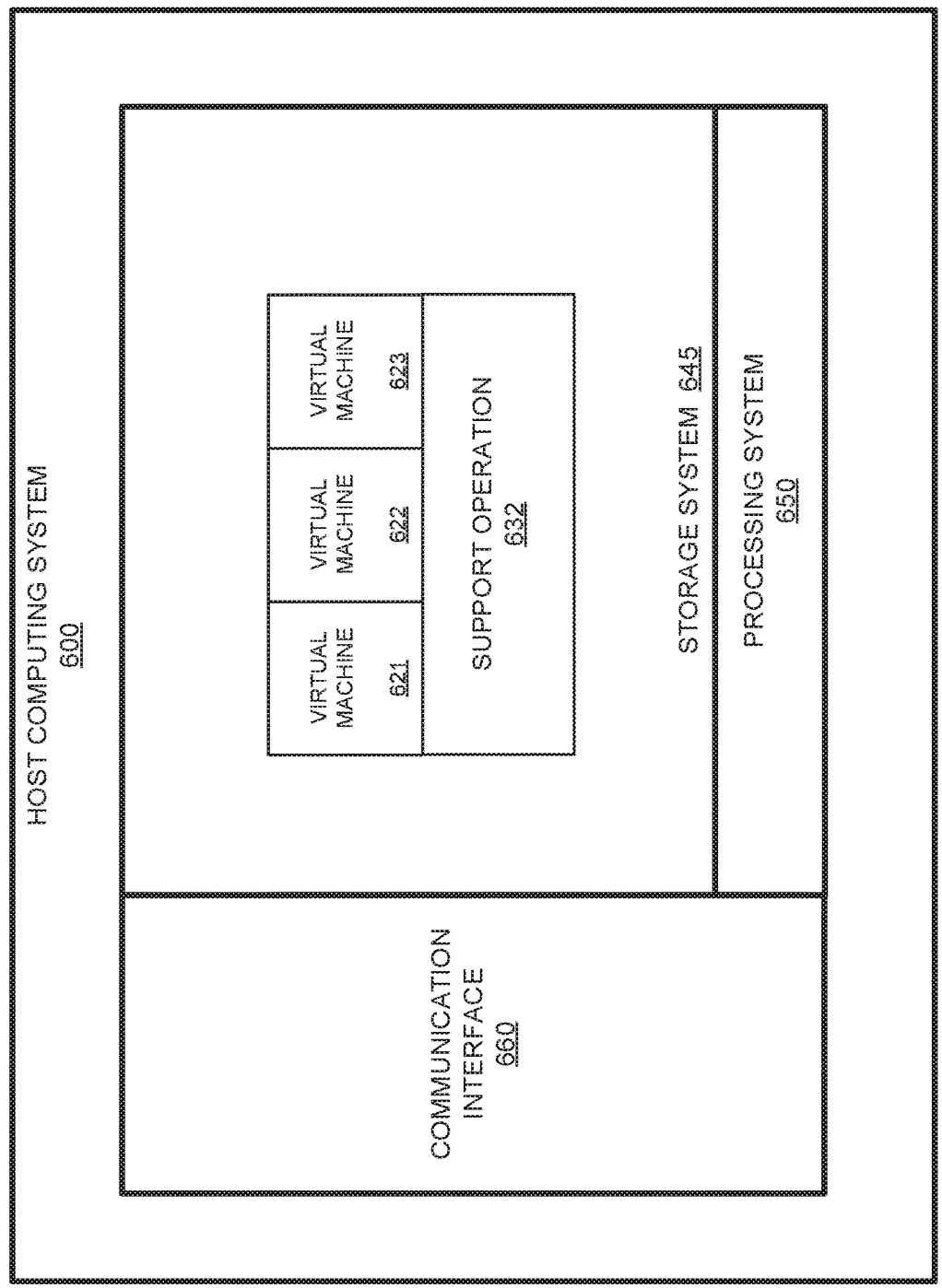
FIG. 6 illustrates a structure of a host computing system according to an implementation.

FIG. 6 illustrates a structure of a host computing system 600 according to an implementation. Host computing system 600 is representative of any computing system or systems with which the various operational architectures, processes, scenarios, and sequences disclosed herein for a host can be implemented. Host computing system 600 is an example of computing element 100 of FIG. 1, although other examples may exist. Host computing system 600 includes storage system 645, processing system 650, and communication interface 660. Processing system 650 is operatively linked to communication interface 660 and storage system 645. Communication interface 660 may be communicatively linked to storage system 645 in some implementations. Host computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is an example of a physical network interface that can be configured to communicate with other computing systems to provide required operations for the processes executing on computing system 600.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises virtual machines 621-623 and support operation 632, which is representative of hypervisor platform and virtual networking platform for virtual machines 621-623 The operating software on storage system 645 may further include utilities, drivers, network interfaces, applications, or some other type of software. When read and executed by processing system 650 the operating software on storage system 645 directs host computing system 600 to operate as described herein.

In at least one implementation, support operation 632 directs processing system 650 to provide a platform for virtual machines 621-623. In some implementations, support operation 632 may abstract the physical components of host computing system 600 and provide the abstracted components to each individual virtual machine. These abstracted components may include processors, graphics processing units, storage, memory, network interfaces, or some other component for the virtual machines. In addition to providing the abstracted components for the virtual machines, support operation 632 may further provide networking operations for virtual machines 621-623. The networking operations may include switching, routing, firewall, or other types of operations.

In the present example, support operation 632 may be used to provide tunnel endpoints that can be used to communicate packets between multiple host computing systems. In particular, tunnel endpoints, which may comprise VTEPs in some examples, obtain packets from the virtual machines, encapsulate the packets, and transmit the packets over a network interface of the host to another host computing system in the computing environment. Once obtained at the destination host, a tunnel endpoint on the destination host may decapsulate the packet and provide the packet to the corresponding destination virtual machine.

Here, to provide the tunnel endpoints to the virtual machines, support operation 632 allocates a unique tunnel endpoint to each tenant with virtual machines on host computing system. In at least one example, when a new virtual machine is added to host computing system 600, support operation 632 may determine a tenant associated with the virtual machine. In some examples, the tenant information may be supplied from a controller that can control the deployment of virtual machines across one or more host computing systems. Based on the tenant information, support operation 632 may determine whether the tenant corresponds to preexisting tunnel endpoint or if the virtual machine requires a new tunnel endpoint. The tunnel endpoint for each of the virtual machines may include a source IP address, VLAN tag, MAC address, or some other addressing information. When a tunnel endpoint exists for a virtual machine, support operation 632 may map the VNIC of the virtual machine to the existing tunnel endpoint. This mapping may permit packets that are destined for another computing system to be forwarded to the tunnel endpoint, such that the tunnel endpoint may encapsulate the packets for communication to the other computing system. In another example, when the tunnel endpoint fails to exist for the tenant, support operation 632 may allocate a new tunnel endpoint to the tenant and map the new virtual machine to the allocated tunnel endpoint. In some implementations, support operation 632 may select an available tunnel endpoint from a pool of available tunnel endpoints. In other implementations, support operation 632 may generate a new tunnel endpoint when the endpoint is required.

Once the virtual machine is mapped to the tunnel endpoint, support operation 632 may perform packet inspection on packets from the virtual machine to determine whether the packets should be forwarded to the tunnel endpoint. When obtained by the tunnel endpoint, the tunnel endpoint may encapsulate the packets, wherein the encapsulation may include at least a tenant identifier. The tenant identifier may be used to perform various operations in relation to the encapsulated packet, including network usage monitoring, quality of service management, or some other operation. Once encapsulated, the packets may be communicated via communication interface 660 to a destination computing system.

In at least one implementation, the tenant identifier may be used to monitor and improve efficiency in the computing environment. In particular, services in a computing environment may identify packets associated with each of the tenants based on the tenant identifier in the encapsulated packet. By identifying the tenants associated with each of the encapsulated packets, the computing environment may determine which of the tenants are using the most network resources and where the frequently communicating virtual machines for each tenant are located. From this information, a management service for the computing environment may migrate frequently communicating virtual machines associated with a tenant to the same host computing system to limit the quantity of encapsulated packets that are required for the tenant.

Although demonstrated in the examples of FIGS. 1-6 using virtual machines, it should be understood that similar operations may be performed with containers. In at least one example, when a container is deployed to a host, the host may determine whether a tunnel endpoint is allocated to the tenant associated with the container and allocate a tunnel endpoint as required for the tenant.

Returning to the elements of FIG. 1, computing system 100 may comprise a physical host computing system or a virtual machine executing on a physical host computing system. The host computing system may comprise communication interfaces, network interfaces, processing systems, computer systems, microprocessors, storage systems, storage media, or some other processing devices or software systems, and can be distributed among multiple devices. The host computing system may comprise software such as an operating system, logs, databases, utilities, drivers, networking software, and other software stored on a computer-readable medium.

Communication between computing system 100 and other computing elements may use metal, glass, optical, air, space, or some other material as the transport media. Communication between computing system 100 and other computing elements may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between computing system 100 and other computing elements may be a direct link or can include intermediate networks, systems, or devices, and can include a logical network link transported over multiple physical links.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:
1. A method comprising:
   identifying a connection of a virtual machine to a port of a virtual switch on a host;
   identifying a tenant of a plurality of tenants associated with the virtual machine;
   determining that a tunnel endpoint is not allocated to the tenant on the host; and
   in response to determining that a tunnel endpoint is not allocated to the tenant:

initiating a tunnel endpoint on the host for the tenant; and directing traffic for the virtual machine to the initiated tunnel endpoint.

2. The method of claim 1 further comprising:

identifying a second connection of a second virtual machine to a second port of the virtual switch on the host;

identifying a second tenant of the plurality of tenants associated with the second virtual machine;

determining that a second tunnel endpoint is allocated to the second tenant on the host; and in response to determining that a second tunnel endpoint is allocated to the tenant, directing traffic for the second virtual machine to the second tunnel endpoint.

3. The method of claim 1, wherein the tunnel endpoint is associated with a tenant identifier.

4. The method of claim 1, wherein the tunnel endpoint is associated with a tenant identifier, and wherein the tenant identifier comprises at least a source encapsulation internet protocol (IP) address and a virtual local area network (VLAN) tag.

5. The method of claim 1, wherein the tunnel endpoint is associated with a tenant identifier, and wherein the method further comprises:

after directing traffic for the virtual machine to the tunnel endpoint, obtaining a packet from the virtual machine;

generating a second packet that encapsulates the first packet, wherein the second packet comprises the tenant identifier.

6. The method of claim 5 further comprising:

determining a quality of service associated with the second packet; and assigning the second packet to an egress queue based on the quality of service.

7. The method of claim 1 further comprising:

identifying a second connection of a second virtual machine to a second port of the virtual switch on the host;

identifying a second tenant of the plurality of tenants associated with the second virtual machine;

determining that a second tunnel endpoint is not allocated to the second tenant on the host; and in response to determining that a second tunnel endpoint is not allocated to the tenant:

initiating a second tunnel endpoint on the host for the second tenant; and directing traffic for the second virtual machine to the second initiated tunnel endpoint.

8. The method of claim 1, wherein the second packet comprises a Virtual Extensible Local Area Network (VXLAN) packet or a Generic Network Virtualization Encapsulation (GENEVE) packet.

9. A computing apparatus comprising:

one or more non-transitory computer readable storage media;

a processing system operatively coupled to the one or more non-transitory computer readable storage media; and program instructions stored on the one or more non-transitory computer readable storage media that, when executed by the processing system, direct the processing system to:

identify a connection of a virtual machine to a port of a virtual switch on a host;

identify a tenant of a plurality of tenants associated with the virtual machine;

determine that a tunnel endpoint is not allocated to the tenant on the host; and in response to determining that a tunnel endpoint is not allocated to the tenant:

initiate a tunnel endpoint on the host for the tenant; and direct traffic for the virtual machine to the initiated tunnel endpoint.

10. The computing apparatus of claim 9, wherein the program instructions further direct the processing system to:

identify a second connection of a second virtual machine to a second port of the virtual switch on the host;

identify a second tenant of the plurality of tenants associated with the second virtual machine;

determine that a second tunnel endpoint is allocated to the second tenant on the host; and in response to determining that a second tunnel endpoint is allocated to the tenant, direct traffic for the second virtual machine to the second tunnel endpoint.

11. The computing apparatus of claim 9, wherein the tunnel endpoint is associated with a tenant identifier.

12. The computing apparatus of claim 9, wherein the tunnel endpoint is associated with a tenant identifier, and wherein the tenant identifier comprises at least a source encapsulation internet protocol (IP) address and a virtual local area network (VLAN) tag.

13. The computing apparatus of claim 9, wherein the tunnel endpoint is associated with a tenant identifier, and wherein the program instructions further direct the processing system to:

after directing traffic for the virtual machine to the tunnel endpoint, obtain a packet from the virtual machine;

generate a second packet that encapsulates the first packet, wherein the second packet comprises the tenant identifier.

14. The computing apparatus of claim 13, wherein the program instructions further direct the processing system to:

determine a quality of service associated with the second packet; and assign the second packet to an egress queue based on the quality of service.

15. The computing apparatus of claim 9, wherein the program instructions further direct the processing system to:

identify a second connection of a second virtual machine to a second port of the virtual switch on the host;

identify a second tenant of the plurality of tenants associated with the second virtual machine;

determine that a second tunnel endpoint is not allocated to the second tenant on the host; and in response to determining that a second tunnel endpoint is not allocated to the tenant:

initiate a second tunnel endpoint on the host for the second tenant; and direct traffic for the second virtual machine to the second initiated tunnel endpoint.

16. The computing apparatus of claim 9, wherein the second packet comprises a Virtual Extensible Local Area Network (VXLAN) packet or a Generic Network Virtualization Encapsulation (GENEVE) packet.

17. The computing apparatus of claim 9, wherein the tunnel endpoint is associated with a tenant identifier, and wherein the program instructions further direct the processing system to notify a control system of the tenant identifier associated with the tenant.

18. An apparatus comprising:

one or more non-transitory computer readable storage media;

a processing system operatively coupled to the one or more non-transitory computer readable storage media; and program instructions stored on the one or more non-transitory computer readable storage media that, when executed by the processing system, direct the processing system to:
  identify a connection of a virtual machine to a port of a virtual switch on a host;
  identify a tenant of a plurality of tenants associated with the virtual machine;
  determine whether a tunnel endpoint is allocated to the tenant on the host; and
  when a tunnel endpoint is not allocated to the tenant:
    initiate a tunnel endpoint on the host for the tenant; and
    direct traffic for the virtual machine to the initiated tunnel endpoint; and
  when a tunnel endpoint is allocated to the tenant:
    direct traffic for the virtual machine to the tunnel endpoint.

19. The apparatus of claim 18, wherein the tunnel endpoint is associated with a tenant identifier, and wherein the tenant identifier comprises at least a source encapsulation internet protocol (IP) address and a virtual local area network (VLAN) tag.

20. The apparatus of claim 18, wherein the tunnel endpoint is associated with a tenant identifier, and wherein the program instructions further direct the processing system to:
  after directing traffic for the virtual machine to the tunnel endpoint, obtain a packet from the virtual machine;
  generate a second packet that encapsulates the first packet, wherein the second packet comprises the tenant identifier.

* * * * *